Oct. 13, 1942.    W. HUMPHREYS    2,299,056
ELECTRIC CONTROLLING APPARATUS
Filed Feb. 28, 1939    2 Sheets-Sheet 1
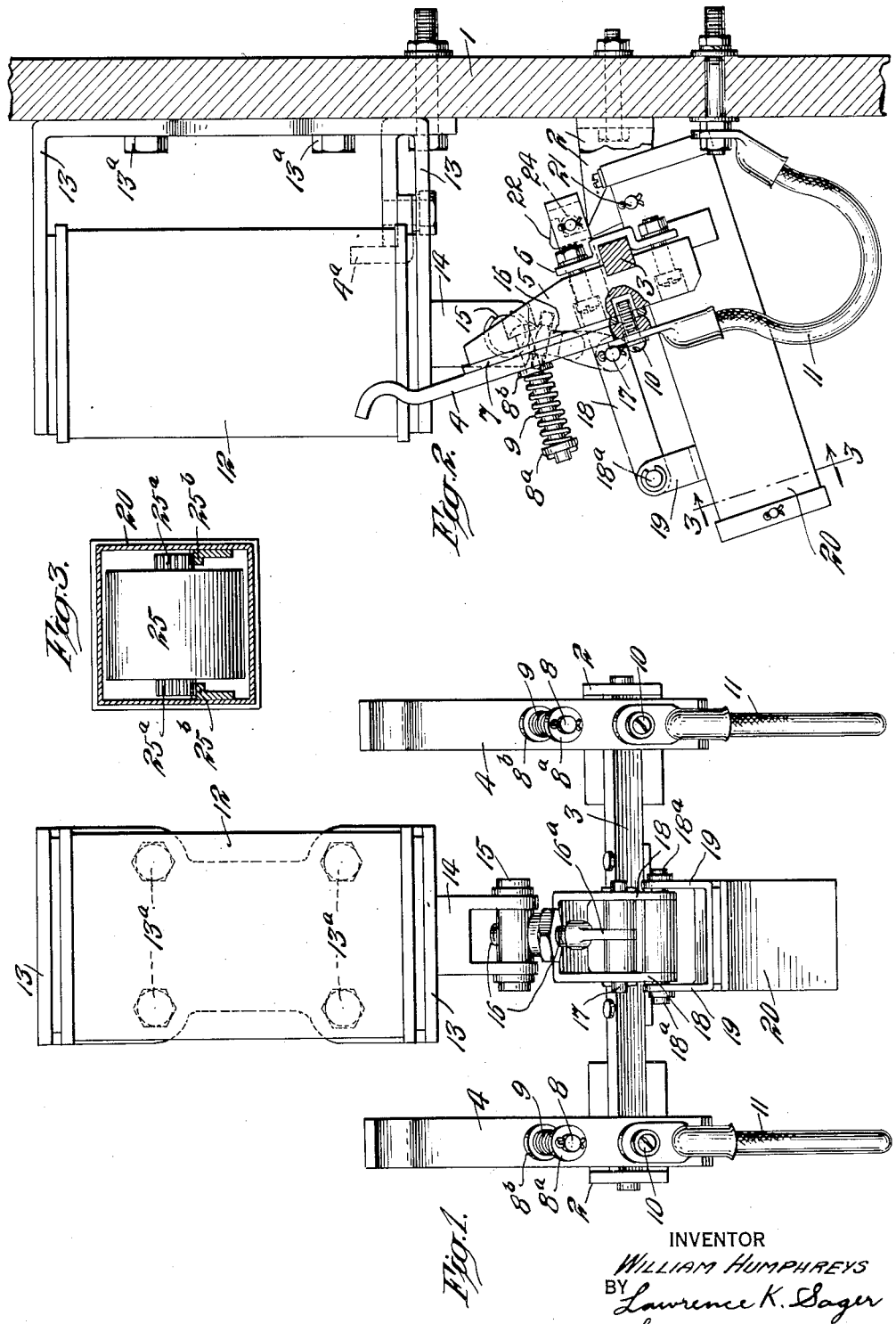
INVENTOR
WILLIAM HUMPHREYS
BY Lawrence K. Sager
his ATTORNEY Oct. 13, 1942.         W. HUMPHREYS                2,299,056
              ELECTRIC CONTROLLING APPARATUS
                  Filed Feb. 28, 1939          2 Sheets-Sheet 2
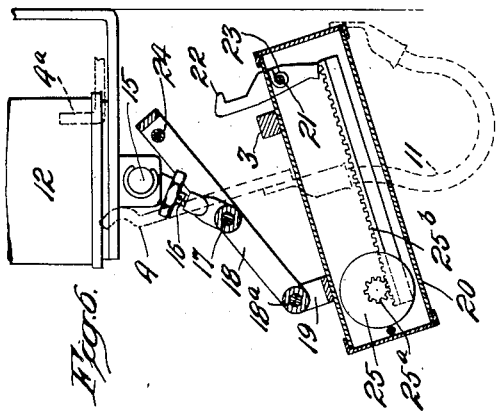
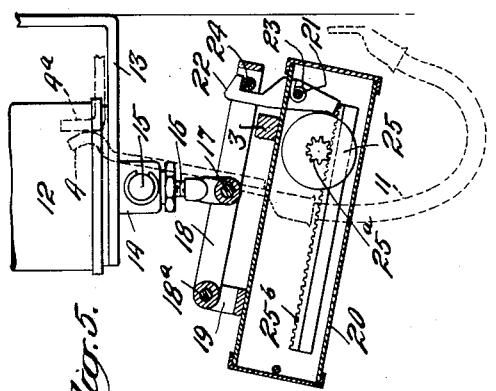
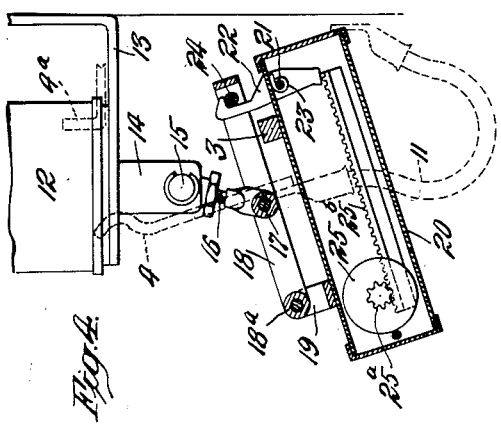
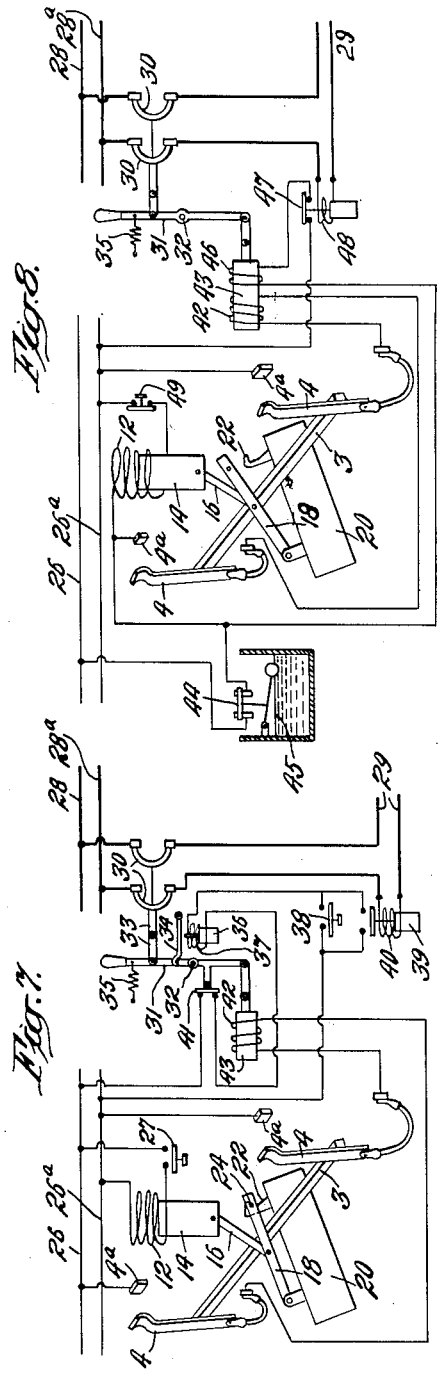
INVENTOR
WILLIAM HUMPHREYS
BY Lawrence K. Sager
his ATTORNEY Patented Oct. 13, 1942

2,299,056

UNITED STATES PATENT OFFICE 2,299,056

ELECTRIC CONTROLLING APPARATUS

William Humphreys, Fullerton, Pa., assignor, by mesne assignments, to The Pennsylvania Company for Insurances on Lives and Granting Annuities, Philadelphia, Pa., a corporation of Pennsylvania Application February 28, 1939, Serial No. 258,904

1 Claim. (Cl. 200—97)

This invention relates to circuit controlling apparatus and to the control of solenoid operated circuit breakers. It also relates to improved time-delay relays.

When solenoid operated breakers are equipped with means for tripping a breaker to an open position, it is desirable to provide a control relay for the closing coil of the breaker which will open the circuit of the closing coil after a period of time, this period of time being that required for completely closing the breaker. If the breaker is not completely closed within that period of time, the current in the closing coil of the breaker should be interrupted in order to permit the breaker to open. The breaker may then be reclosed after the cause of the failure to close has been remedied. Furthermore, the current in the closing coil of the breaker should be interrupted after a short period of time because the closing coil is not required to carry a current continuously after the closing of the breaker because the breaker is held closed by other means; also if the closing coil were permitted to carry current continuously while the breaker is closed, it would impose a heavy drain of current upon the auxiliary source which supplies current to the closing coil. By the present invention, current is supplied to the closing coil of the breaker for a predetermined short interval of time and then discontinued. Another application of this invention is to cases where the circuit breaker is maintained closed during the time a maintained controlling contact is closed, such as in the case of a float switch where the coil of the control relay is kept energized continuously while the maintained contact is closed but wherein the closing coil of the breaker is opened after the breaker is closed in order to avoid loss of energy in the closing coil. The improved form of control relay of this invention is applicable to various purposes where contacts or other parts are to be controlled after a predetermined period of time following the initial action of the relay.

One object of this invention is to provide a simplified form of controlling means which will be durable and dependable in operation under long continued use. Another object is to simplify the required wiring connections and avoid the use of various auxiliary switches. Another object is economy in operation by reducing the consumption of energy to a minimum after the operation of the relay and parts controlled thereby. Other objects and advantages will be understood from the following description and accompanying drawings which illustrate preferred embodiments of the invention.

Fig. 1 is a front elevation of the relay and contacts controlled thereby; Fig. 2 is a side view thereof partly in section; Fig. 3 is an enlarged cross-section of a portion of the relay on line 3—3 of Fig. 2; Figs. 4, 5 and 6 are side views of a portion of the relay, partly in section, showing different positions thereof; Fig. 7 is a diagram showing the invention wherein the relay controls a circuit breaker; and Fig. 8 is a similar diagram showing a different form of control.

Referring to Figs. 1 and 2, the relay is mounted upon a vertical panel 1. Angle brackets 2 are secured to the panel and extend outwardly to form bearings for the ends of a horizontally extending shaft 3 of square cross-section. This shaft carries near its ends a pair of movable contact members 4 which extend upwardly and in their closed position are adapted to engage a pair of fixed contacts 4a which are mounted on the panel 1. The movable contacts 4 are supported by parts 5 in front of the shaft 3 which parts embrace the outer portion of the shaft 3. A strap 6 is bolted at its ends to each of the elements 5 and embraces the inner portion of the shaft and thereby firmly secures each of the parts 5 to the shaft. A strip 7 of insulating material is introduced between each of the elements 5 and its contact 4. A pin 8 passes outwardly through the upper portion of each part 5 and freely through the insulating strip 7 and the contact arm 4 and at its outer end is secured a disk 8a. A similar disk 8b is positioned on the outer face of the contact arm and between these disks is located a spring 9 which tends to hold the contact arm yieldably against the strip 7.

A screw 10 passes through the lower end of each contact arm and has a threaded engagement therewith and projects inwardly into an opening in the element 5 with sufficient clearance to permit free movement therein. The head of the screws 10 engages lugs connected to flexible conductors 11, the other ends of which are fastened to the panel 1 and form terminal connections of the movable contact members 4. The screws 10 and pins 8 are insulated from the supporting elements 5. When the shaft 3 is rotated, it will bring the upper ends of the movable contacts 4 into engagement with the fixed contacts 4a, the spring 9 permitting the contact arms to move outwardly from the supporting elements 5 for insuring proper engagement of the contacts in closed position. This yieldable movement of the contact arms is permitted by the freedom of movement of the inner ends of the screws 10 in the openings in elements 5.

Above the shaft 3 and between the pair of relay contacts is a solenoid coil 12 which is supported by upper and lower U-shaped brackets having outwardly extending arms 13 and bolts 13a for securing the same to the panel. Within the solenoid winding is a vertical movable plunger 14 which has a bearing at its lower end for a pin 15. This pin carries a lug engaged by an adjustable bolt 16 which bolt has a perforated lower end 16a through which passes a pin 17. This pin is pivoted in the sides of a pair of arms 18 which extend inwardly and outwardly, the pin being located at about midway between the ends of the arms. The outer ends of the arms 18 are pivotally mounted upon a pin 18a, the ends of which are supported by upwardly projecting brackets 19. These brackets are fixed to the top and near the outer end of a hollow box 20 of rectangular form as shown in Fig. 3. The box is of elongated form and extends inwardly towards the panel 1 and is fastened near its inner end to the underside of shaft 3 as shown in Figs. 4, 5 and 6.

A pin 21 is pivotally mounted between the sides of the box in the upper inner corner and secured to the pin is a latch 22 which extends upwardly through an opening in the box. The latch is biased by a spring 23 which encircles the pin 21 and has one end engaging the underside of the box and the other end engaging the latch or pin for biasing the upper end of the latch inwardly. At the inner end of the arms 18 is a pin 24 extending crosswise between them and carrying a roller in the form of a sleeve which roller is adapted to be engaged by and retained by the latch 22 when the arms 18 extend parallel with the top of the box 20, which condition is shown in Figs. 4 and 5. Within the box 20, as shown in Figs. 3, 4, 5 and 6, is a roller 25 of sufficient mass to secure the desired operation. Fastened to each side of this roller is a pinion 25a; and extending lengthwise on each side of the box is a rack 25b which racks are engaged by the pinions 25a. It is evident that the roller 25 and its pinions may travel from one end of the box to the other end whenever the box is tilted in a direction to cause gravity to move the roller. The racks and pinions insure a definite mode of travel and prevent the roller from sliding within the box, the roller being supported by its pinions.

When the box is tilted with its outer end down, as shown in Fig. 4, the roller will assume a position at the outer end of the box. When the box is tilted so that the outer end is up, as shown in Fig. 5, the roller will move from its outer position toward the inner end of the box and will then engage the lower end of the latch 22 and overcome its biased position so as to reelase the pin 24. Fig. 5 shows the position of the parts at the time the roller is engaging the lower end of the latch. The releasing of the latch will permit the parts to assume the position shown in Fig. 6, the inner ends of the arms 18 being drawn upwardly, while the weight of the box and other parts will cause the outer end of the box to move downwardly to the position shown in Fig. 6. This tilts the box in such a direction that the roller 25, after having tripped the latch, will pass along between the racks to the outer and lower end of the box to the position shown in Fig. 6.

The operation of the relay will be understood by first considering the parts as shown in the open position of Figs. 2 and 4. Here the contact arms 4 are in their outer position and the roller 25 is in the outer lower end of the box 20, the latch 22 engaging the pin 24. When current is supplied to the winding 12 of the relay, its plunger 14 is drawn upwardly and raises the arms 18 and box 20 upwardly to the position shown in Fig. 5. As the box 20 is fastened to the shaft 3, this upward movement of the box will rotate the shaft 3 and thereby bring the contact arms 4 of the relay into engagement with the fixed contacts 4a. As soon as the outer end of the box 20 is raised, the roller 25 starts to move toward the inner end of the box and after a predetermined time of travel of the roller then strikes and releases the latch 22. This permits the arms 18 to be raised to the position shown in Fig. 6 and permits the outer end of the box to move downwardly and thereby rotate the shaft 3 in the reverse direction and swing the contact arms 4 outwardly to their initial open position, as shown by the dotted lines in Fig. 6. The roller then moves to the outer end of the box to the position shown in Fig. 6.

It will be apparent from the above described method of operation that upon excitation of the relay winding 12, the relay contacts are quickly closed and after a predetermined time of closure, the relay contacts are released and thrown to their open position. The period of closure is determined by the time the roller 25 takes in traveling from the outer end of the box 20 to the position where it engages the latch 22. This lapse of time can be adjusted to any desired amount by varying the distance the roller is permitted to travel, as by restricting the outer position of the roller to different limits by a stop, or by changing the diameter of the pinions 25a. The time interval may be adjusted also by changing the slope imposed upon the box in its raised position, as by adjustment of the bolt 16. Various other means for changing the time interval may be resorted to.

The time required to complete the closing operation of ordinary circuit breakers is approximately fifteen cycles of a 60 cycle service; and when this relay is utilized to control the closing of such a circuit breaker, a proper time delay interval before opening the relay contacts would be about one second which allows ample time for the breaker to close, even on the lowest operating voltage. Thus for such a purpose, the movable element 25 of the relay and its related parts will be designed to cause this element to occupy approximately one second in its travel from the outer end of the box to the time it engages the latch 22.

After the relay has performed its function of closing the relay contacts and then opening them after a predetermined time, its winding 12 may be deenergized and permit its plunger 14 to drop. The parts will then assume the position shown in Fig. 4, the arms 18 being re-latched and related to permit another closing operation when the coil 12 is again energized.

In Fig. 7 the parts already described are indicated by corresponding reference numerals and the solenoid winding 12 is shown supplied with energy from an auxiliary source as indicated by the supply lines 26 and 26a. A push button 27 is adapted to close the circuit of this winding. At the right of the figure are indicated main supply lines 28, 28a which are adapted to be connected to a load circuit 29 through a circuit breaker having a pair of movable contacts 30. Any form of circuit breaker may be used and for the purpose of simplicity there is indicated a main closing lever 31 mounted on a fixed pivot 32 and connected to the movable contacts 30 by links 33 which will be suitably guided and supported. The breaker is retained in closed position by a pivoted latch 34 against the action of the spring 35, or other means, tending to move the breaker to its open position. This restraining latch is adapted to be tripped by the movement of a core 36 of a trip coil 37. The trip coil may be energized by manually moving push button 38 to its closed position or by the movement of the core 39 of an overload relay having a winding 40 in series in the load circuit. The trip coil 37 of the breaker is energized from the auxiliary source, the circuit passing from line 26 through a contact 41 carried by the lower portion of the main lever of the breaker and engaging contacts of the trip coil circuit when the breaker is in its closed position. From the switch contact 41 the trip circuit continues through the trip coil 37 and thence to contacts in parallel which are adapted to be closed respectively by switch 38 and the overload coil switch, the circuit being completed by a connection to the auxiliary supply line 26a. The closing coil 42 of the breaker is provided with a plunger 43 which is connected through suitable links to the lower end of the main lever 31 of the breaker. The closing coil of the breaker is energized when the contact arms 4, 4 of the relay are in their closed positions, the circuit being traced from auxiliary line 26 to one of the fixed contacts 4a, then to a movable contact 4 and thence through the coil 42 to the other movable contact 4 and its fixed contact 4a to the other line 26a of the auxiliary source.

The parts are shown in their normal positions when the circuit breaker is closed. The breaker may be opened by closing the switch 38 which will energize the trip coil of the breaker. It also may be opened by otherwise energizing the trip coil such as by the closing of the contacts of the overload relay 40 upon the occurrence of an overload in the load circuit. When the breaker is in its open position, it may be closed by closing the push button switch 27 of the relay coil 12. The actuation of the relay causes its contacts to be closed in the manner already described. This energizes the closing coil 42 of the circuit breaker which actuates the breaker to its closed position where it is restrained by the latch 34. In this closed position, the switch 41 is moved to its closed position so as to permit the trip coil of the breaker to be energized when the overload relay is actuated or the switch 38 moved to its closed position, as already described. In the closing action of the breaker the controlling relay will function in the manner already described, the relay parts being moved first to their closed position as shown in Fig. 5, and then after a predetermined time interval, the roller 25 will trip the latch 22 and open the relay contacts, the parts then assuming the position shown in Fig. 6. During the time interval between the closing of the relay contacts and their opening, the circuit breaker has been given ample time to complete its closing action under normal operating conditions; and the relay serves to de-energize the closing coil 42 of the breaker after a predetermined time. In this manner, no further energy is consumed in the closing coil of the breaker after it has once been closed. The operator may now release the push button switch 27 which will de-energize the relay coil 12 and permit its plunger to drop from the position shown in Fig. 6 to that shown in Fig. 7. This causes the parts to be re-latched and places the relay in condition to be closed again when it is desired to reclose the circuit breaker.

However, if in the attempted closing of the circuit breaker, some abnormal condition is present which causes the restraining means of the breaker to be rendered ineffective in holding the breaker in its closed position, then it will be apparent that the closing coil 42 of the breaker is energized for a determined period of time only and is then automatically deenergized by the action of the relay in the manner above described. Thus even if the relay coil 12 be continuously energized for a long period of time, it will have no effect upon the energization of the closing coil 42 of the breaker and the latter will remain in its open position. The operator is then required to first permit switch 27 to open before the breaker can be reclosed. This opening of the switch 27 permits the parts of the relay to assume their latched position as shown in Fig. 7 which is necessary before the relay contacts can be closed again. If the fault in the load circuit controlled by the breaker has been removed, then the reclosing of the switch 27 will actuate the relay and cause the automatic closing of the breaker in the manner already described; but if the fault has not been removed, a further attempt to close the breaker by the relay will result in the action already described of passing a current through the closing coil 42 of the breaker for only a predetermined interval of time, after which the relay contacts automatically move to their open position. Thus this controlling apparatus serves as a non-closable circuit breaker under abnormal conditions and secures an anti-pumping trip free control for a latched-in breaker, the pumping action being avoided because the closing coil of the breaker is deenergized by the control relay until the relay coil has first been deenergized by the opening of switch 27 and then energized by the closing of this switch. Such reclosing will again cause the closing coil of the circuit breaker to be excited for a short definite period only.

In Fig. 8 the parts similarly numbered correspond to those already described. In this figure the apparatus is adapted to automatically control the closing and opening of the circuit breaker for controlling the action of a pump or other apparatus depending upon the position of a switch whose open or closed position is determined by change of air pressure, temperature, the level of a liquid, or other conditions requiring the operation or discontinuance of operation of a device controlled by the circuit breaker. Fig. 8 shows, for example, a float switch 44 controlled by the condition of a liquid level 45, the switch being moved to closed position when the water level reaches a minimum and maintained in such position until the water has attained the desired level. The switch 44 is connected to one side 26 of the auxiliary supply line and from this switch the circuit continues through the coil 12 of the relay and a normally closed push button switch 49 to the other side of the line. It also continues to one of the fixed contacts 4a of the relay which when closed completes the circuit to one of the arms 4 and closing coil 42 of the breaker through the other arm 4 and fixed contact 4a to the other side of the line. The circuit also extends from switch 44 to a holding coil 46 of the breaker and thence through a normally closed switch 47 of an overload relay 48 in the load circuit of the breaker; and from the switch 47, the circuit is completed to the line 26a of the auxiliary supply.

Fig. 8 shows the parts in their normal operating position, the switch 44 and circuit breaker being closed, the closing coil 42 being deenergized and the breaker being maintained in closed position by the energization of the holding coil 46. The controlling coil 12 of the relay is energized and holds its plunger in its upper position with the relay contacts open and the parts corresponding to the condition shown in Fig. 6. It is evident that the relay cannot act to close its contacts, or reenergize closing coil 42 of the breaker, until the coil 12 has been deenergized to permit its plunger to fall so that the parts may assume the position shown in Fig. 4. In case an abnormal condition occurs in the load circuit, such as to cause the opening of the circuit of holding coil 46, as by the operation of the overload relay 48, the breaker cannot be reclosed until the push button 49 has been operated to open the circuit of the relay coil 12 for permitting the parts to relatch. The reclosing of the circuit of the control coil 12 by the switch 49 will cause the breaker to be reclosed and will remain closed provided the fault has been remedied.

After the pump or other device in the load circuit controlled by the circuit breaker has been operated a sufficient length of time to cause the switch 44 to open, this will deenergize the holding coil 46 and result in the breaker being automatically opened and will also result in deenergizing the relay coil 12 so as to permit its parts to assume their latched position as shown in Fig. 4. When the conditions cause the reclosing of switch 44, the relay coil will then be energized and cause the breaker to be closed in the manner already described, the holding coil 46 serving to restrain the breaker in closed position after the closing coil 42 has been deenergized by the automatic action of the relay. It is apparent that this apparatus prevents the closing of the circuit breaker whenever there is any abnormal circuit condition, prevents the energization of the closing coil beyond a short predetermined time interval and prevents any reclosing action of the relay, or circuit breaker, until the relay coil 12 has been deenergized to permit the parts of the relay to assume a latched position preparatory to a reclosing of the relay and a reenergization of the closing coil of the breaker.

Although particular examples of controlling apparatus and a particular structure of the time delay relay have been shown and described, it will be understood that various modifications may be made without departing from the scope of the invention and that various other applications of the invention may be made according to particular requirements. The auxiliary source for operating the control apparatus may be direct current or alternating current and in the latter case the cores of the actuating windings should be laminated.

I claim:

Control mechanism comprising a switch movable between two positions and biased in one position to move to the other position, a movable element for moving said switch to the biased position, a pivoted element movable with said switch, a latch for holding said pivoted element in fixed position with reference to said switch, said movable element and pivoted element being mechanically connected with each other, and a time delay device mechanically connected with said switch and actuated by the movement of said switch to the biased position for releasing said latch to permit the movement of said switch to the unbiased position after a predetermined time interval from the movement of said switch to the biased position.

WILLIAM HUMPHREYS.